(12) United States Patent
Aumann

(10) Patent No.: US 10,902,202 B2
(45) Date of Patent: Jan. 26, 2021

(54) METHOD FOR SYSTEM FOR REDACTING AND PRESENTING DOCUMENTS

(75) Inventor: Yehonatan Aumann, Jerusalem (IL)

(73) Assignee: REFINITIV US ORGANIZATION LLC, New York, NY (US)

( * ) Notice: Subject to any disclaimer, the term of this patent is extended or adjusted under 35 U.S.C. 154(b) by 992 days.

(21) Appl. No.: 12/590,895

(22) Filed: Nov. 16, 2009

(65) Prior Publication Data

US 2011/0119576 A1    May 19, 2011

(51) Int. Cl.
| | | |
|---|---|---|
| *G06F 17/00* | (2019.01) | |
| *G06F 40/295* | (2020.01) | |
| *G06Q 30/02* | (2012.01) | |
| *G06Q 10/10* | (2012.01) | |
| *G06F 21/62* | (2013.01) | |
| *G06F 16/93* | (2019.01) | |
| *G06F 16/174* | (2019.01) | |
| *G06F 40/16* | (2020.01) | |

(52) U.S. Cl.
CPC ........ *G06F 40/295* (2020.01); *G06F 16/1744* (2019.01); *G06F 16/93* (2019.01); *G06F 21/6245* (2013.01); *G06F 40/16* (2020.01); *G06Q 10/10* (2013.01); *G06Q 30/02* (2013.01)

(58) Field of Classification Search
CPC ..... G06Q 10/10; G06F 2/6218; G06F 40/295; G06F 16/93
USPC ................. 715/230, 232–233, 200, 253, 255
See application file for complete search history.

(56) References Cited

U.S. PATENT DOCUMENTS

| | | | |
|---|---|---|---|
| 5,581,682 A * | 12/1996 | Anderson et al. ............ | 715/236 |
| 5,903,646 A * | 5/1999 | Rackman ....................... | 705/51 |
| 7,428,701 B1 * | 9/2008 | Gavin et al. .................. | 715/243 |
| 7,475,242 B2 * | 1/2009 | Baird et al. ................... | 713/166 |
| 7,805,673 B2 * | 9/2010 | der Quaeler et al. ........ | 715/255 |
| 7,913,167 B2 * | 3/2011 | Cottrille ....................... | 715/271 |
| 8,369,593 B2 * | 2/2013 | Peng .......................... | G06T 7/12 |
| | | | 382/128 |
| 10,515,153 B2 * | 12/2019 | Heilman ................ | G06F 40/30 |
| 2003/0115481 A1 | 6/2003 | Baird et al. | |
| 2006/0075228 A1 | 4/2006 | Black et al. | |
| 2006/0218149 A1 * | 9/2006 | Patrick ............................. | 707/9 |

(Continued)

OTHER PUBLICATIONS

International Search Report, PCT/US2010/002983, dated Feb. 18, 2011.

*Primary Examiner* — Manglesh M Patel

(74) *Attorney, Agent, or Firm* — Duncan Galloway Egan Greenwald, PLLC; Kevin T. Duncan

(57) ABSTRACT

A method and system that automatically or semi-automatically analyze documents and redact key elements of importance to potential purchasers of the documents. Potential purchasers, or others, are presented with versions of the document that more fully reflect the particular information contained in the document but which do not disclose critical key data points that are of most importance to the purchaser. Upon reviewing a redacted version of the subject document, the viewer may elect to purchase or otherwise obtain the original document or report with information un-redacted. Alternatively, viewers are able to selectively purchase, or otherwise obtain, portions of the document in an a la carte fashion. The invention provides a Graphical User Interface (GUI) to effect the selective election of information, such as recommendations, ratings, market share, graphical representations, tables, etc.

34 Claims, 12 Drawing Sheets

(56) References Cited

U.S. PATENT DOCUMENTS

| | | |
|---|---|---|
| 2006/0196926 A1 | 11/2006 | Benson et al. |
| 2007/0094594 A1* | 4/2007 | Matichuk et al. ............ 715/530 |
| 2009/0019379 A1* | 1/2009 | Pendergast et al. .......... 715/762 |
| 2009/0135444 A1* | 5/2009 | Best et al. ................... 358/1.15 |
| 2009/0164878 A1* | 6/2009 | Cottrille ....................... 715/210 |
| 2009/0164881 A1* | 6/2009 | Segarra et al. ............... 715/230 |
| 2010/0131551 A1* | 5/2010 | Benzaken et al. ............ 707/769 |
| 2011/0265177 A1* | 10/2011 | Sokolan et al. ................ 726/19 |

\* cited by examiner

| | |
|---|---|
| Jefferies & Company, Inc. | June 18, 2009 |

| | |
|---|---|
| Technology<br>Internet Software & Services<br><br>United States of America | Technology<br>eWeekly: Google Strengthens Search Lead in May; Bing Gaining Momentum in June<br><br>Investment Summary<br>We saw a pullback in Internet stocks this week, in line with the broader market, with the JII off 4.7% vs. the S&P 500 off 3.2%. YTD, JII is still up 20.8% vs. S&P 500, up 1%. Given such a run, Q2 results that are likely to be inline with expectations, lack of 2H09 visibility, and summer seasonality, we remain cautious on the group ST |
| 300 | Event<br>In this weekly update, we discuss early results of Bing's launch and implications for the search landscape.<br><br>Key Points<br>• Search activity remains robust. Total search queries in the US in May grew 33% Y/Y, reflecting: 1) consumers' appetite to use search for Web navigation and bargain hunting, and 2) increased use of the Internet as a cheap entertainment platform. Our channel checks suggest that while 2Q has not seen material improvement in online spend, the large businesses continue to spend on SEM and SEO initiatives to drive traffic.<br>• Google increases its lead in May... Google's search volume grew faster than the market in May at 39.7%, capturing 65% of market share vs. 64.2% in April. Google's gains come at the expense of Yahoo! (down ~30bps m/m), Microsoft (down ~20bps m/m), and AOL (down ~30bps m/m). While Yahoo!'s share was slightly down, it still remained stable in the 20%+ range.<br>• ... But MSFT gains momentum with the launch of Bing. comScore data suggests that Bing has attracted more searchers and higher search pages since launching the new platform 2 weeks ago, buoyed by a ~$100M ad campaign (which debuted last week.) Curiosity and novelty are certainly two elements driving the interest as users test the much-hyped engine; the important question is how sustainable will the share gain be once media attention and the mktg push abate. Our channel checks suggest that Bing has captured the searcher and search page share from the other four engines in roughly equal proportions.<br>• comScore's report may be a less relevant gauge to assess Bing's performance since it did not include key metrics such as search query share or monetization. The increase in search result pages for Bing could indicate a higher use of the navigation options to refine searches, which increases page count, and/or lower relevance of results. Net net, it is too early to tell.<br>• Is this a repeat of Cashback? MSFT's cashback reward for users of its search engine drove share gains in May to June 08 by roughly 70bps, or a 15% m/m uptick in volume. This increase was, however, short lived as the company's market share reverted back to ~8.0% in May 09. While a sustained marketing push would help Bing gain incremental share over time, we think it's unlikely that it will materially alter the competitive landscape, except maybe for weaker players like Ask and AOL. Having said that, material gains in traffic would require not just aggressive marketing but also a potential distribution deal with Yahoo!, in our opinion.<br>• For the week ended 06/16/09, the Jefferies Internet Index (JII) is down 4.67% vs. the S&P 500, which was down 3.24%. YTD, the Jefferies Internet Index is up 20.8% vs. the S&P 500, which is up 0.96% (see pg 5). |

Little respite in 3Q09
In aggregate we expect the telecom companies we cover in Korea, China, Singapore and New Zealand to report 8% revenue growth in 3Q09 translating to 3% EBITDA grown and 1% NPAT decline. SingTel and the Korean mobile operators should report good growth but the rest are likely to be flat to down on pcp. We remain Underweight on this sector (which has underperformed by 53% YTD). Our only Buy recommendations are in Korea where investor expectations are low (single digit PEs) and fundamentals don't look as bad as the rest of the sector.

>> SingTel and Korean mobile should report well
Strong 3Q09 growth is expected from SingTel and the Korean cellular operators. All of SingTel's key earnings contributors (domestic, Optus, Bharti and Telkomsel) should post good growth this quarter with currency movements expected to have only a minor negative impact on the overall S$ result. MNP in Korea eased in 3Q09, and in Sep numbers were lowest in 2004. Korean fixed line was very competitive.

>> Sector down 53% YTD
The telco sector in Asia Pacific (ex-Japan) continues to underperform the broader markets, now down 53% YTD on a relative basis. The sector beta is 0.75 so some underperformance is expected in a rising market, but not this much! Structural issues (in particular government sponsored national fibre networks and new mobile licenses) have dampened the outlook for the sector across the board.

>> Look to hide in Korea
With a cloudy outlook for most companies in the sector we look for markets and stocks where investor expectations are low. The only Buys we have are on the 3 Korean telcos which trade on single digit PEs (KT, LGT and LD Dacom). The Korean market looks set to benefit from cost cutting associated with sector consolidation which should drive at least some earnings growth.

>> SingTel the next best large-cap option in the region
Although rated a Hold, SingTel is the next best large cap telco stock. The Chinese telcos look dear given earnings declines this year and flat earnings next year. The smaller Singapore operators are groaning under the weight of pressure from SingTel. Telstra and TCNZ look unlikely to perform as while their governments weigh up how best to invest in fibre networks to compete against their own profitable fixed networks.

Hedge fund investors
Low beta sector may not be overly attractive to hedge funds.

Long-only investors
Look to invest in cheap Korean names, KT, LGT and LG Dacom. SingTel also worth a look at these levels. However continue to underweight the sector on a regional basis.

Stocks for action
| Company | Rating | Price (9/10/2009) | Target price |
|---|---|---|---|
| KT | BUY | 39,800 | 47,400 |
| LG Dacom | BUY | 19,500 | 23,400 |
| LG Telecom | BUY | 9,100 | 10,600 |
| StarHub | HOLD | 1.97 | 2.15 |
| SingTel | HOLD | 3.08 | 3.32 |
| Telstra | HOLD | 3.16 | 3.25 |
| SK Telecom | HOLD | 180,500 | 185,000 |
| China Telecom | HOLD | 3.78 | 3.70 |
| TCNZ | HOLD | 2.57 | 2.45 |
| SKB | HOLD | 5,310 | 5,020 |
| China Mobile | REDUCE | 77.25 | 73.10 |
| China Unicom | REDUCE | 11.16 | 9.10 |
| MobileOne | REDUCE | 1.81 | 1.40 |
Note: Prices are in local currencies
500
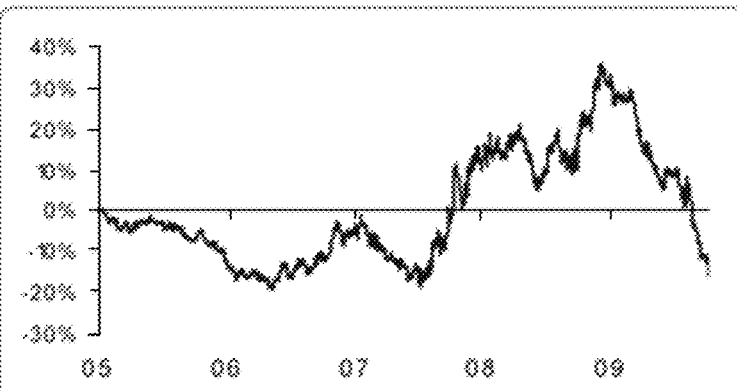
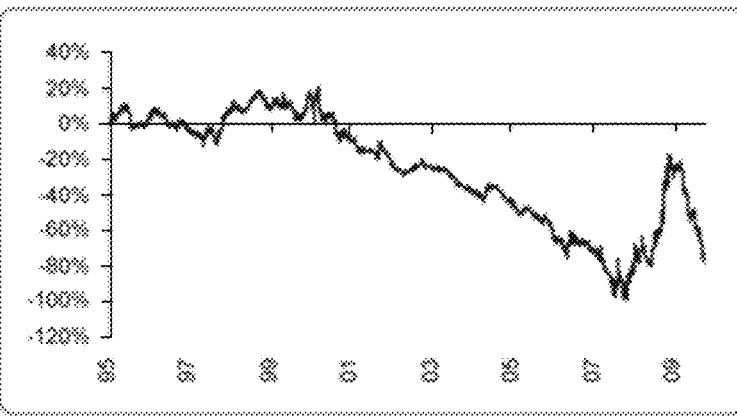
Figure 5B

Little respite in 3Q09

602 In aggregate we expect the telecom companies we cover in ▆, ▆, ▆ and ▆ to report 8% revenue growth in 3Q09 translating to 3% EBITDA grown and 1% NPAT decline. ▆ and the ▆ mobile operators should report good growth but the rest are likely to be flat to down on pcp. We remain Underweight on this sector (which has underperformed by 53% YTD). Our only Buy recommendations are in ▆ where investor expectations are low (single digit PEs) and fundamentals don't look as bad as the rest of the sector.

>> ▆ and ▆ mobile should report well

604 Strong 3Q09 growth is expected from ▆ and the ▆ cellular operators. All of ▆'s key earnings contributors (domestic, ▆, ▆ and ▆) should post good growth this quarter with currency movements expected to have only a minor negative impact on the overall S$ result. MNP in ▆ eased in 3Q09, and in Sep numbers were lowest in 2004. ▆ fixed line was very competitive.

>> Sector down 53% YTD

606 The telco sector in Asia Pacific (ex-▆) continues to underperform the broader markets, now down 53% YTD on a relative basis. The sector beta is 0.75 so some underperformance is expected in a rising market, but not this much! Structural issues (in particular government sponsored national fibre networks and new mobile licenses) have dampened the outlook for the sector across the board.

>> Look to hide in ▆

608 With a cloudy outlook for most companies in the sector we look for markets and stocks where investor expectations are low. The only Buys we have are on the ▆ telcos which trade on single digit PEs (▆, ▆ and ▆). The ▆ market looks set to benefit from cost cutting associated with sector consolidation which should drive at least some earnings growth.

>> ▆ the next best large-cap option in the region

610 Although rated a ▆, ▆ is the next best large cap telco stock. The ▆ telcos look dear given earnings declines this year and flat earnings next year. The smaller ▆ operators are groaning under the weight of pressure from ▆. ▆ and ▆ look unlikely to perform as while their governments weigh up how best to invest in fibre networks to compete against their own profitable fixed networks.

Hedge fund investors
Low beta sector may not be overly attractive to hedge funds.

Long-only investors
Look to invest in cheap ▆ names, ▆, ▆ and ▆. ▆ also worth a look at these levels. However continue to underweight the sector on a regional basis.

Figure 6A

☑ Little respite in 3Q09

In aggregate we expect the telecom companies we cover in Korea, China, Singapore and New Zealand to report 8% revenue growth in 3Q09 translating to 3% EBITDA grown and 1% NPAT decline. SingTel and the Korean mobile operators should report good growth but the rest are likely to be flat to down on pcp. We remain Underweight on this sector (which has underperformed by 53% YTD). Our only Buy recommendations are in Korea where investor expectations are low (single digit PEs) and fundamentals don't look as bad as the rest of the sector.

☐ >> ▆▆▆ and ▆▆▆ mobile should report well
Strong 3Q09 growth is expected from ▆▆▆ and the ▆▆▆ cellular operators. All of ▆▆▆'s key earnings contributors (domestic, ▆▆▆ and ▆▆▆) should post good growth this quarter with currency movements expected to have only a minor negative impact on the overall S$ result. MNP in ▆▆▆ eased in 3Q09, and in Sep numbers were lowest in 2004. ▆▆▆ fixed line was very competitive.

☐ >> Sector down 53% YTD
The telco sector in Asia Pacific (ex-▆▆▆) continues to underperform the broader markets, now down 53% YTD on a relative basis. The sector beta is 0.75 so some underperformance is expected in a rising market, but not this much! Structural issues (in particular government sponsored national fibre networks and new mobile licenses) have dampened the outlook for the sector across the board.

☐ >> Look to hide in ▆▆▆
With a cloudy outlook for most companies in the sector we look for markets and stocks where investor expectations are low. The only Buys we have are on the ▆▆▆ telcos which trade on single digit PEs (▆▆▆, ▆▆▆ and ▆▆▆). The ▆▆▆ market looks set to benefit from cost cutting associated with sector consolidation which should drive at least some earnings growth.

☐ >> ▆▆▆ the next best large-cap option in the region
Although rated a ▆▆▆, ▆▆▆ is the next best large cap telco stock. The ▆▆▆ telcos look dear given earnings declines this year and flat earnings next year. The smaller ▆▆▆ operators are groaning under the weight of pressure from ▆▆▆. ▆▆▆ and ▆▆▆ look unlikely to perform as while their governments weigh up how best to invest in fibre networks to compete against their own profitable fixed networks.

Hedge fund investors
Low beta sector may not be overly attractive to hedge funds.

Long-only investors
Look to invest in cheap ▆▆▆ names, ▆▆▆, ▆▆▆ and ▆▆▆. ▆▆▆ also worth a look at these levels. However continue to underweight the sector on a regional basis.

Figure 7A

METHOD FOR SYSTEM FOR REDACTING AND PRESENTING DOCUMENTS

FIELD OF THE INVENTION

The present invention relates to processes, software and systems for use in delivery of services related to the financial services sector as well as systems for use in other areas, such as other professional services and in technical research and education sectors. More particularly, the present invention relates to a system that identifies key terms, phrases, images, graphics, or sections for redaction from documents, such as reports, articles and other documents related to financial concerns, technical research, professional services, industries, and companies, to be presented in conjunction with an offer to purchase or otherwise obtain such documents such as via an online service.

BACKGROUND OF THE INVENTION

In many areas and industries, including the financial and legal sectors and areas of technology, for example, there are content and enhanced experience providers, such as The Thomson Reuters Corporation. Such providers identify, collect, analyze and process key data for use in generating content, such as financial reports, scientific reports and studies, law related reports, articles, etc., for consumption by professionals and others involved in the respective industries, e.g., stock brokers and advisors, fund managers, financial planners, investors, scientists, lawyers, etc. Providers in the various sectors and industries continually look for products and services to provide subscribers, clients and other customers and for ways to distinguish their firms over the competition.

For example, with advancements in technology and sophisticated approaches to investment, investors and associated professionals and advisors increasingly rely on mathematical models and algorithms in making trading determinations. Recent studies have shown that 70% of trading volume is based on some form of formulaic model. Firms looking for an edge are increasingly looking for intelligent information and differentiated content to compete in trading and in particular high-frequency trading. Firms that provide such content, technology and decision support tools for qualitative and quantitative research and analytics for trading often deliver content in the form of industry reports, company reports, trading patterns, etc. These reports are often presented for sale, such as electronically via an online Internet service, to potential purchasers. The reports may be purchased for download from such a service. A problem facing such firms is the long existing balance between disclosing enough of the contents to potential purchasers to entice purchase without revealing so much as to give much of the information away for free. Common solutions to this problem are to provide the user with specific predefined sections of the document such as the title and abstract. Alternatively, a table of content is provided. However, such methods leave much to be desired, as they frequently do not adequately convey the depth of the analysis, the nature of the findings contained in the report or many other attributes that attract the interest of potential purchasers. Redacting the documents by hand would be time-intensive, costly, inefficient, and inconsistent.

Sectors outside of the financial area in which content delivery is critical is in technical documents, for example, IEEE (Institute of Electrical & Electronics Engineers) transactions articles may be presented for purchase at IEEE website. Other technical society websites offer articles, papers and other documents for purchase. Other scientific concerns include Thomson Reuters' Web of Science™ and Web of Knowledge™. Also, Thomson Reuters' Westlaw® provides reports on judges, courts, etc. that they market to attorneys looking for content about a judge or court. This may be for investigating a judge or court assigned to a case or for selecting a forum in which to file a case. For example, a report may include background information on a judge, numbers and types of cases adjudicated by the judge, success rate by defendant and plaintiff broken down by subject matter of litigation, number of cases resolved by settlement, etc. Another exemplary report is a global patent report that reflects one or more of data and analysis related to worldwide filings of patent applications, areas of art in which patents are being granted and at what allowance rates, filings and issuance by subject matter, costs associated with filings, litigation, etc.

SUMMARY OF THE INVENTION

In one embodiment, the invention provides a method and system that automatically or semi-automatically, i.e., with some degree of human intervention, analyzes a document, such as a financial analysis report, and redacts information, such as words, terms, word strings, or other data, that are of great value to a potential purchaser of the document. The redaction of information may or may not be contextual. The invention goes beyond the prior art of simply providing potential purchasers with the title and abstract of the report and provides them with a far more comprehensive version of the report but with key elements, e.g., terms and/or phrases, such as recommendations, ratings, etc., redacted. In this manner the present invention serves the dual purpose of presenting potential purchasers, or others, with versions of the document that more fully reflect the particular information contained in the document while not disclosing the critical key data points that are of most importance to the purchaser. Upon reviewing a redacted version of the subject document, the viewer may elect to purchase or otherwise obtain the original document or report with information un-redacted.

In one alternative embodiment, the invention enables viewers to selectively purchase, or otherwise obtain, portions of the document in an a la carte fashion. For instance, instead of purchasing the entirety of the report, a viewer may be provided with the option of paying a lesser amount, or using up some form of allocation or credit, to view only a portion of the redacted information. The invention provides a Graphical User Interface (GUI) to effect the selective election of information, such as recommendations, ratings, market share, graphical representations, tables, etc. In further alternative configurations, the invention may provide for a progressive credit to the viewer as the viewer purchases or otherwise obtains portions of the document such that once the viewer has cumulatively reached the full value of the offer then the viewer is provided with the complete un-redacted original document. This is particularly attractive where the sum of the redacted "parts" or portions of the document exceed a cost or allocation of the whole un-redacted original document. This may encourage viewers to view portions to whet their appetite with the assurance that worst case is that they pay or are allocated the set value of the whole document.

The invention can be used in a variety of applications and types of reports/documents. The invention may utilize various techniques to redact data and/or text including, for example, erasing the text and/or data, "painting" the area with a specific color (black, white, etc.), distorting the area in some way (e.g., pixelization). The following are examples of types of data or reports to which the invention may be applied: financial reports of all types; scientific papers; legal documents (including patents); specifications; and any other type of report or document that is presented for potential purchase.

The present invention may be applied to very long documents and large document collections to achieve a level of consistency and efficiency that would not be realized even if attempted with subjective and varying human redaction techniques. For these reasons human redaction on a commercial scale, or any scale, is not practiced and is not practical.

In a first embodiment the invention provides a computer-implemented method comprising the following steps: associating an original electronic document with an offering; identifying a set of content type information to redact from the original document, the set of content type information being identified for redaction based at least in part on criteria other than location of the content type information within the original electronic document; generating a redacted version of the original document by redacting the set of content type information from the original electronic document; receiving a request for a set of information related to the original document and identifying a set of responsive information; and in response to the request, transmitting the redacted version of the original document. The generating step may further comprise one or more of the group consisting of: removing the set of content type information; blackening the set of content type information; obscuring the set of content type information; deleting the set of content type information; distorting the set of content type information; and replacing the set of content type information with unintelligible information. The set of content type information may comprise one or more of the group consisting of: text; words; numbers; letters; formulas; equations; graphical representations; table data; identities; identifiers; percentages; names; dates; recommendations; analysis; and quotes. The set of content type information may comprise one or more of the group consisting of: a financial number; a recommendation; a rating; a set of financial phrases; a currency amount; a company name; market related information; graphical representations; table related information; formula related information; nouns; verb phrases; adjectives; facts; events; technical findings; and research findings. The offering may be one of a group consisting of: an offer to purchase; an offer to utilize an existing account; an offer to utilize an existing credit; an offer to utilize an existing allocation; a marketing program; a charitable offering; and an education related offering. The transmitting step may further comprise transmitting a set of offers comprising offers respectively associated with at least one portion of the set of content type information redacted from the original document, whereby less than all of the set of content type information redacted from the original document may be un-redacted. The generating step may further comprise automatically presenting for manual selection at least some of the content type information and receiving a set of responses representing selections from among the at least some of the content type information for redaction and may further comprise a set of selections comprising accept, reject, change or add to the presented manual selection. The method may further comprise the steps of: after transmitting the redacted version of the original document receiving a second request indicating a desire to receive a second set of responsive information, the second set of responsive information comprising at least a portion of the set of responsive information; and transmitting the second set of responsive information, and may further comprise: transmitting an offer associated with the second set of information; and receiving acceptance of the offer prior to transmitting the second set of information, whereby at least part of the set of content type information redacted from the original electronic document is revealed.

In a second embodiment, the invention provides an article comprising a machine-readable medium, the medium having stored thereon instructions to be executed by a machine to perform operations, the article comprising instructions adapted to: associate an original electronic document with an offering; identify a set of content type information to redact from the original document, the set of content type information being identified for redaction based at least in part on criteria other than location of the content type information within the original electronic document; generate a redacted version of the original document by redacting the set of content type information from the original electronic document; receive a request for a set of information related to the original document and identifying a set of responsive information; and in response to the request, transmit the redacted version of the original document.

In yet a third embodiment, the invention provides a computer-based system comprising memory and a processor for executing instructions to perform operations, the system comprising: input adapted to receive an original electronic document associated with an offering; a redaction module adapted to identify a set of content type information to redact from the original document, the set of content type information being identified for redaction based at least in part on criteria other than location of the content type information within the original electronic document and to generate a redacted version of the original document by redacting the set of content type information from the original electronic document; input adapted to receive a request for a set of information related to the original document and identifying a set of responsive information; and output adapted to transmit, in response to the request, the redacted version of the original document.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 3 is a schematic diagram of a redacted version of an original document in accordance with the present invention with a GUI for selectively acquiring redacted information;

FIG. 4 represents a partially redacted version of an original document resulting from a user selection using the GUI of FIG. 3;

FIGS. 5A-B illustrate an "original," un-redacted document;

FIGS. 6A-B depict an exemplary redacted version of the document in FIGS. 5A-B;

FIGS. 7A-B depict a partially-redacted version of the document in FIG. 5A-B;

DETAILED DESCRIPTION OF THE INVENTION

Figure 1:
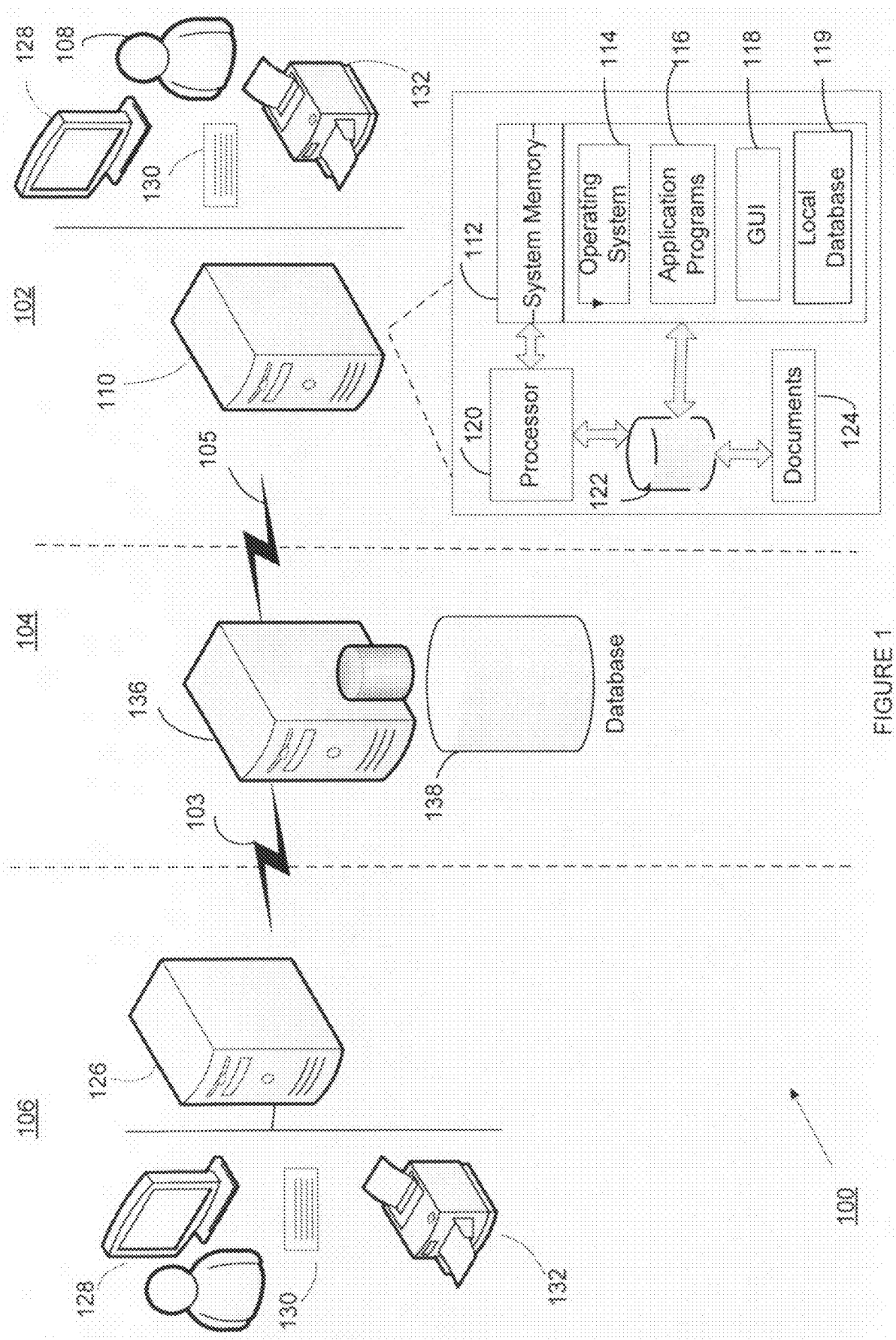
FIG. 1 is a schematic diagram illustrating an exemplary computer-based system for implementing the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The invention is intended for use in connection with efforts directed to offering to interested persons, such as financial analysts, a document or report on some subject of interest to that interested person, e.g., stock recommendation or market report. This offer may be in the form of an offer to purchase the document or report but does not necessarily involve a "sale." The offer may be in connection with an existing license and relate to an available allocation of documents, pages, etc. that a user may have access to. This offer could also be in connection with a marketing campaign or program or an educational or research program. The term "offer" is used herein in the broadest sense to refer generally to presenting an opportunity to view, access or obtain a document to persons interested in such document and is not intended to require legal requirements as to what constitutes a binding offer for acceptance. The best way to convince the interested party that the report is of value to him/her is to provide him/her with a copy of the report. However, once the customer gets a copy of the document, the information has been transferred, and there is less incentive for the customer to purchase the report. The invention provides a system and method for presenting significant contents of the report to the customer, without actually revealing key components, such as critical value judgments, recommendations, statistical analysis and results, etc. That is, the system will generate a redacted version of the original document that contains the overall nature of the contents without revealing the critical data.

In one embodiment, the redaction system automatically or semi-automatically identifies key elements of a document and hides, conceals, removes, obscures or blackens key information in a document or report to generate a redacted version of the document. The redacted version of the report is then presented for viewing to interested persons so that the reader gets a feel for the type of information in the report, but lacks some or much or all of the key information of interest. For example, following the redacting process, a portion of the text may read: "We are xxxx about MSFT's new direction and expect earnings to come in xxx of expectations." Examples of types of information to redact or hide, include: recommendation values; dollar amounts; numbers; phrases that represent trends ("go up", "go down"); value judgments. A more comprehensive, though not limiting, list of possible criteria used in the redaction process is discussed below.

With reference to FIG. 1, an exemplary embodiment of the present invention is illustrated in conjunction with a system 100 for analyzing, redacting, and presenting for purchase documents, such as financial reports. System 100 includes a local document generating or analyzing system 102, an intermediate document processing and presentment system 104 and a remote document viewing and purchasing system 106. The redaction processes discussed hereinbelow may be applied at one or both of systems 102 and 104. In many real world applications, systems 102 and 104 may be combined, co-located, or part of a single organization. For instance, a company that provides content and analysis in the financial services sector, such as Thomson Reuters Corporation, for delivery to members of the financial industry, such as fund managers, may be represented by both systems 102 and 104 with the fund manager represented by system 106. In addition, documents for sale and redaction may be generated outside the system 100, which may be primarily for presentment and sale of outside generated documents. Systems 102/104 may represent an organization, such as a technical society, that presents for purchase papers generated by members of the society, some of which may be papers published in connection with journals, proceedings, etc. associated with that society.

Aspects of the system 100 may be enabled using any combination of Internet or (World Wide) WEB-based, desktop-based, or application WEB-enabled. The local document generating or analyzing system 102 includes a controller or processor 110, such as a PC computer or the like, that may comprise a typical combination of hardware and software including, as shown in respect to computer 110, system memory 112, operating system 114, application programs 116, graphical user interface (GUI) 118, processor 120, and storage 122 which may contain electronic information 124 such as electronic documents. The redaction techniques of the present invention, described in detail hereafter, are preferably in the form of software stored on machine-readable medium and comprising instructions executed, for example, by the processor 120 of computer 110. The instructions related to the redaction techniques may be stored as an application program 116 in system memory 112. For purposes of this description, and not by way of limitation, we will refer to the redaction function as "Redaction Module." The operating system 114 should be suitable for use with the Redaction Module and browser functionality described herein, for example, Microsoft Windows Vista (business, enterprise and ultimate editions), or Windows XP Professional with SP2. Also, the Redaction Module and associated software may include custom integration with Adobe Acrobat applications, scanning software, and Microsoft Office applications, e.g., Outlook, Word and Excel, as well as other applications used to interrogate or apply redaction techniques. Application programs 116 may include, for example, Adobe Acrobat, Microsoft Office 2007, Office XP, or Office 2003. The system may require the client machines to be compatible with minimum threshold levels of processing capabilities, e.g., Intel Pentium III, speed, e.g., 500 MHz, and other parameters.

System 102 may further comprise interface peripherals such as monitor 128, keyboard 130, and printer 132 and may be used to communicate remotely, such as via the Internet, with database server system 104. System 102 may include a network of computers, such as over a LAN, WLAN, Ethernet, token ring, FDDI ring or other communications network infrastructure. An operator or user 108 may establish communication link 105 with the database system 104, which may serve as a repository of both original reports and redacted reports and may serve to perform the redaction processes as well as to present the redacted versions of documents to potential purchasers of or those otherwise interested in obtaining the original documents. Remote document viewing and purchasing (or acquisition) system 106, such as a fund manager workstation, may be configured in a similar fashion as system 102. Although the exemplary embodiments may be described in terms of "purchasers," and "purchasing" systems or acts, the invention is intended for a broader use that includes non-sales situations, such as access to original documents via an existing license or other program with other allocation criteria. The configuration described in this example is one of many and is not limiting as to the invention. Software to perform functions associated with system 100 may include self-contained applications within a desktop or server or network environment and may utilize local databases, such as SQL 2005 or above or SQL Express, IBM DB2 or other suitable database, to store documents, collections, and data associated with processing such information. Any of several suitable communication links are available, such as one or a combination of wireless, LAN, WLAN, ISDN, X.25, DSL, and ATM type networks, for example.

The redaction module or redaction system is configurable to automatically determine what exactly to redact or "hide" and what not to redact or hide. The redaction system may use semantic technology (e.g., Thomson Reuters Corporation's ClearForest text analysis technology) to automatically identify the data and/or text for hiding or redacting. The identification and redaction process may be performed automatically, or semi-automatically with varying degrees of human intervention. The redaction system and method may be applied to very long documents and large document collections to achieve a level of consistency and efficiency that would not be afforded, even if attempted, with subjective and varying human redaction techniques.

The following are examples of criteria that may be used for determining terms or strings or sequences of terms in a document for redaction by the system. However, the following criteria are only exemplary and are not limiting and may be used separately or in any combination. The nature of the document or subject and other considerations may be applied to determine which of the following, or other criteria, are most desirable for use in the redaction process.

Many documents include statistics, revenues, profits, percentage of market share, and other numerical values that are of great interest to the targeted reader. For instance, in considering whether or not to purchase a report on a given industry or market sector a financial advisor may be very interested in learning the market share breakdown within a particular industry. In another scenario a financial advisor investigating a company of interest, such as for potential investment, may be interested in projected or anticipated profits, sales, etc., of a company over a given period, e.g., projected financial performance over the next five years. In this context, numbers that appear in documents are key pieces of information and by removing the numbers themselves without removing the surrounding text, the invention provides a potential purchaser with a clear understanding of what the report includes but without revealing the most critical information—the numbers. In the redaction process, when numbers or numerical representations appear in a document the process may consider one or more of the following criteria: any number; numbers with special marks—e.g. $, %, etc.—before/after the number or number string; numbers with specific meaning(s): earnings, earning projection, dates; numbers that appear in text form, e.g., "twenty percent"; and proportional representations, e.g., ⅓, one-half, "five out of ten."

For many potential purchasers of reports, e.g., industry or company reports, the identity of entities, persons, companies, suppliers, customers, business partners, etc. may be of critical interest and the knowledge of the identity of such entities alone may be worth the purchase of the report. The following represents terms or phrases that may be selectively used alone or in combination in the redaction process to render a redacted version of a document for review and for purchase or access.

Exemplary names or nouns that may be identified or selected for redacting using the invention include: named entities; named entities of one or more specific type(s), e.g., people, companies, or products; noun phrases with special characteristics in the document, e.g., frequently appearing in the document, infrequently appearing in the document, mentioned/not-mentioned in the title/first paragraph; noun phases for which special types of verb phrases or adjectives are used (discussed below).

In addition, the invention may identify, analyze, and recommend based in whole or in part on verb-phases. For example, verb phases of special type(s)—e.g. representing stock movement (going up, weakening, exceeding or breaking through moving averages, etc.). Also, verb phases referring to entities of any or a subset of the noun types described above. In addition, the invention may identify, analyze, and recommend based in whole or in part on adjectives. Adjectives of a special type(s), e.g., representing very positive or negative assessment such as "excellent" and "awful," may be identified. Adjectives referring to entities of any or a subset of the noun types described above. The invention may include algorithms to identify facts and events to be redacted from the document prior to presentment to potential purchasers. In particular, facts or events of specific types (e.g. earning announcements, law suit), facts or events relating to entities of any or a subset of the noun types described above. In the redaction process, after identifying one or more "fact or event," the system may redact the entire term or term string or it may redact only specific elements of the mention (e.g., the company name and the date).

Additional criteria for potential redaction include table related information. For example, an entire table or specific columns or rows, e.g., the summary row, may be redacted. In addition, the system may be configured to redact some or all of the numbers within the table. Another candidate for redaction is a graph, e.g., the entire graph may be redacted or the redacted version of the document may retain the axis and legend or labeling on the axes while removing the guts of the graph or the data represented by the graph. Also, formulas and equations, or at least the data plugged into and the result of such formulas and equations, are typically of importance and interest to potential purchasers and may be redacted. The system may selectively redact any type of formula, formulas of a specific type, e.g., chemical formulas, or formulas or equations with specific characteristics, e.g., based on length or on the presence of specific variables.

Additional criteria for redaction include graphic or typographic clues, e.g., font size and type. Moreover, the document structure or associated tagging or other indicia may be used to redact content, e.g., all content except section titles.

Other criteria for redaction include the following. The system may be configured to redact text with a specific structure or pattern. For example, a sentence mentioning two companies or two consecutive sentences in which the second sentence somewhat negates the first sentence or the first sentence in each paragraph. Also, a counting routine may be used in which, for example, every other or every third word, or the first word of every sentence is redacted. In another variation, the system may use an example-based method in which the redaction routine considers examples of patterns or other schemes and generalizes automatically to make redaction determinations.

In addition, it is understood that the redaction system may use any and all combinations of the above, including weighted combinations. The applications of some or all of the above criteria and any weighting associated with such criteria may be predetermined or may be based on an initial interrogation of the document by the system, e.g., the system makes an initial pass at the document to determine the existence of certain patterns, terms, structures, verb-phrases, nouns, adjectives, tables, graphs, formulas or equations, and numbers.

In implementing the application of the redaction criteria, the system preferably applies one or both of two core methods to locate the data/text to be redacted. One core method is "rules-based" and involves providing the system with the exact rules that determine what should be redacted and how to identify it. For example, there are known systems having a rules-based method for identifying specific types of named entities (e.g. companies, people) and for specific types and events (e.g. mergers, earning announcements, family relations), etc. The invention is not limited to any particular such rules-based system.

The other core method used to locate data and/or text for redaction is "example-based" in which the system is provided with examples of redacted documents (or portions thereof) and machine-learning techniques are used whereby the system automatically generalizes and learns what to redact in other cases. Preferable machine learning techniques include Hidden Markov Models (HMMs), or variations referred to as hierarchical, layered, hidden semi, or variable-order Markov models, and Conditional Random Fields (CRFs), a discriminative probabilistic model often used to label or parse sequential data, such as in this instance natural language text. In the alternative or in addition, other deterministic models or techniques may be used separately or in conjunction with HHM and CRF methods. Bayesian technique is a statistical inference wherein evidence and observations provide inferences or update inferences to the probability that a hypothesis is or is not true. Bayesian inference model is in part based on the scientific method of collecting evidence that is either consistent or inconsistent with a given hypothesis and adjusting the degree of belief in a hypothesis as evidence accumulates. Additional exemplary statistical and other models and techniques that may be applied include: estimation theory, sequential dynamical system, Baum-Welch algorithm (an algorithm for computing the probability of a particular observation sequence used to find the unknown parameters of a HHM), Viterbi algorithm (used to determine the most likely sequence of hidden states), Poisson processes and distributions, and time-inhomogeneous Hidden Bernoulli Model. HHMs and the like are often used in pattern recognition applications, e.g., voice, speech and text recognition, and are often used in a way to provide a system that learns or otherwise develops understanding based on experiences, observations and statistical inferences.

The invention may have as a basis using semantic and linguistic analysis techniques and such techniques can be used as a form of pre-processing for either a rules-based or example-based method. Examples of such semantic and linguistic technologies includes openly available solutions offered by Thomson Reuters Corporation's ClearForest, e.g., Open Calais (www.opencalais.com), BBN Technologies, Inxight Software, Inc., ANNIE ("A Nearly New IE (Information Extraction)" system based on GATE—General Architecture for Text Engineering) and others.

The system for redacting data and/or text may be implemented in many ways, including, for example, one or more of erasing the text and/or data, "painting" the area with a specific color (black, white, etc.), distorting the area in some way (e.g., pixelization). The following are examples of types of data to which this may be applicable: financial reports of all types; scientific papers; legal documents (including patents); specifications; and any other type of report or document that is presented for potential purchase.

Figure 2:
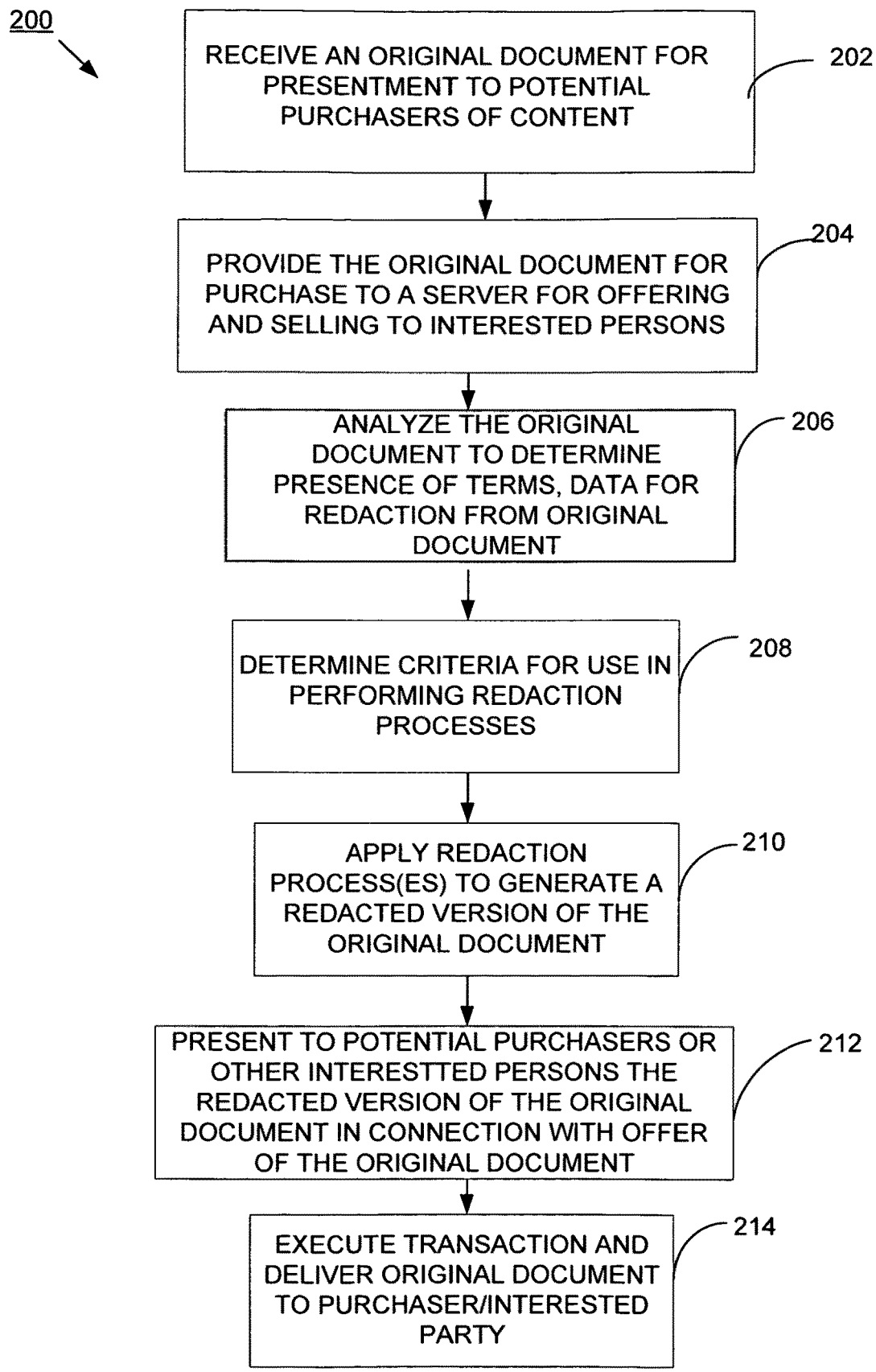
FIG. 2 is a flow chart illustrating an exemplary method of implementing the present invention.

FIG. 2 illustrates one preferred method, 200, of practicing the invention in which at step 202 an original document, such as a financial report, is received for presentment to potential purchasers, such as stock analysts, of such document. At step 204 the original document is provided to a server for electronic offer and sale of the document. At step 206 the original document is analyzed for determining the presence of data and/or terms that may be redacted. At step 208 the system determines criteria to be used in redacting data and/or terms from the original document. At step 210 the redaction process(es) is applied to the original document to generate a redacted version of the original document. Step 210, as well as other steps, may be automated, semi-automated or by hand. For example, the system may present suggestions to a user, such as by using a GUI screen, for selecting from among a variety of proposed actions, e.g., accept, reject, change or add to proposed actions. This may be accomplished using varying degrees of human intervention. At step 212 the redacted version of the document is presented to potential purchasers of the original document. This may be in conjunction with an offer to purchase the original, un-redacted version of the document or may be in association with an existing contract between the service provider and the client. In one alternative, the user may access the system under an existing service contract in which a credit, a license or a remaining allocation of subject matter (e.g., pages) is available to the individual. At step 214 the system executes the transaction related to the offer and delivers the original document or a partially-redacted version of the original document (using the a la carte option) to the purchaser/interested party.

Figure 4:
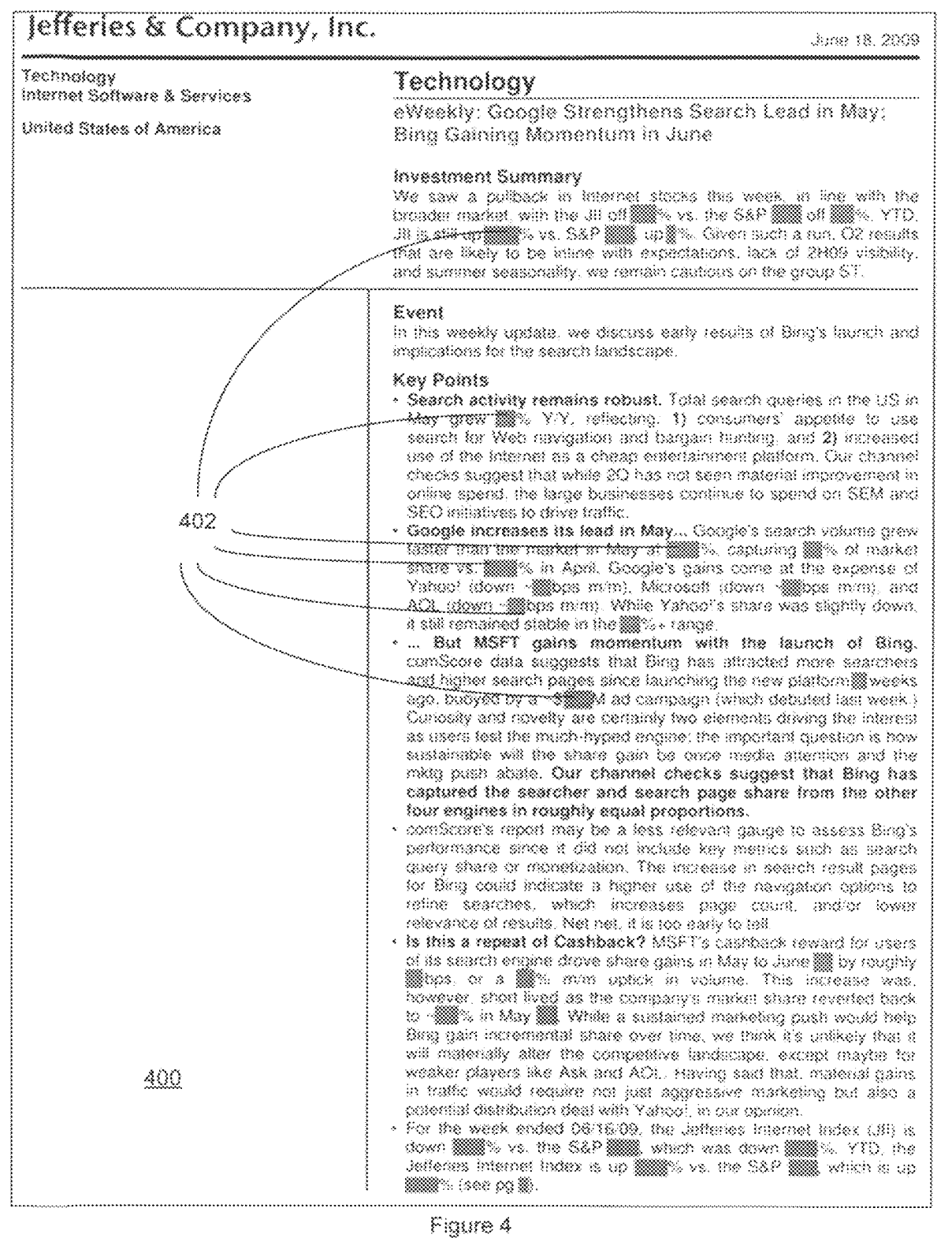

FIGS. 3 and 4 show examples of a single page from a financial report for "Jefferies & Company, Inc." ("Jeffries" report). Such reports typically contain many pages but for purposes of the following example, a single page from such a report is discussed. FIG. 3 shows the first page of an un-redacted "original" Jeffries report with all data and recommendations contained on that page of the document. This represents a "before" version of the document. FIG. 4 shows one exemplary redacted version 400 of the original page 300 of the Jeffries report after having one or more of the redaction techniques described herein applied against the electronic document file. Table 1, below, shows the text included in the example of FIGS. 3 and 4 with the redacted information underlined. In this particular example, the single criterion applied to result in page 400 was to redact numbers, where the entire string is a number and not merely a string containing numbers in addition to other characters. In this example, the criterion allows for characters appearing adjacent "number" terms that are commonly associated with numbers. In this example the system recognizes as a number those number strings adjacent to characters such as % (percentage), $ (US dollar sign—as well as other currency identifiers), bps (book value per share or basis points), for example. In this example, the criterion would not recognize the string "Q1" as a number and such a term would not be redacted, although other criteria may result in the redaction of such a term. The redacted version of the original report, of which page 400 of FIG. 4 is a part, may be presented, such as in an online environment, to potential purchasers of the original report. In this example, grayed or blacked boxes 402 are overlaid on the text being redacted to obscure the text from view. In this implementation, the redacted document retains the same basic structure, pagination, etc. as the original. In an alternative implementation, the redacted version may have a different appearance in that its pagination and other structure may vary from that of the original. For instance, where a graph is to be redacted, rather than distort the graph it may be removed altogether and the vacated space replaced with un-redacted information so that the location of information on the redacted version of the document has a different appearance to that of the original. Where text is to be redacted, rather than blackening out the text the system may remove the text with a "[redacted]" indication or the like in its place. This may cause the spacing of surrounding text and other content to change, thus causing a different pagination to the redacted version.

As can readily be seen by examining the exemplary page 400, viewing a redacted version of the report gives potential purchasers a true sense of the contents of the report and the nature of its recommendations and underlying data and assumptions without seeing the actual recommendations and underlying data and assumptions. In this manner the invention whets the appetite of the purchaser without giving away data that is key to the report. In one manner of implementation, the original version of the document is generated and made available for purchase or otherwise available to the user. The redaction system applies one or more of the above described techniques to generate a redacted version of the original report that may be posted for viewing via the website or may be included as an attachment or via embedded link within an email or other communication to potential purchasers of the report. Just as there may be multiple versions of the report directed to different audiences or markets, there may be more than one redacted version of the report.

Figure 6B:
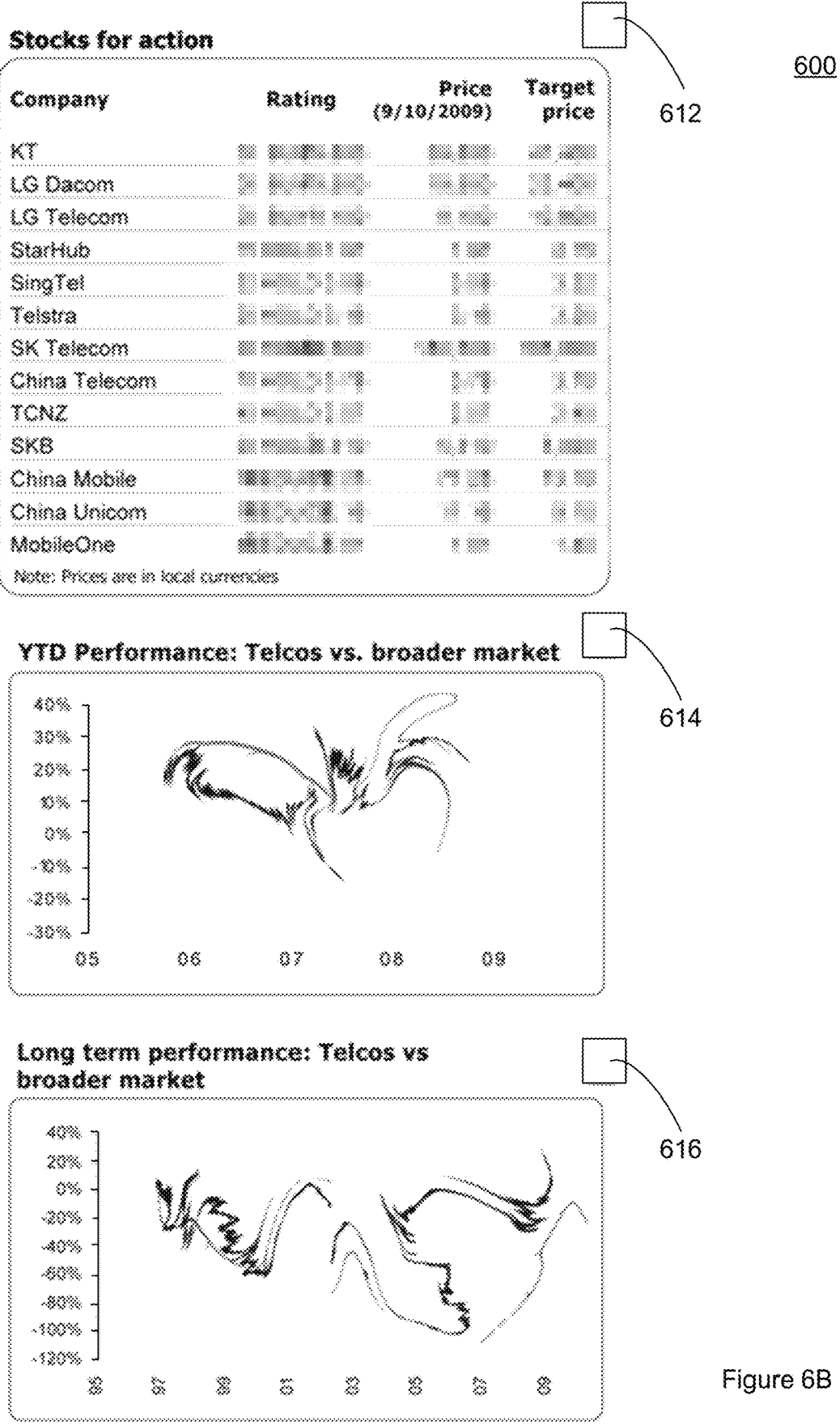

FIGS. 5-6, respectively illustrate an additional example, "Little Respite in 3Q09", of applying one or more of the redaction techniques described herein to an original document to generate a redacted version of the document for viewing prior to purchase or other transaction. FIGS. 5A-B illustrate a first page 500 of an "original" document, while FIGS. 6A-B illustrate a first page 600 of an exemplary

TABLE 1

Investment Summary

We saw a pull back in Internet stocks this week, in line with the broader market, with the JII off 4.7% vs. the S&P 500 off 3.2%. YTD, JII is still up 20.8% vs. S&P 500, up 1%. Given such a run, Q2 results that are likely to be inline with expectations, lack of 2H09 visibility, and summer seasonality, we remain cautious on the group ST.

Event

In this weekly update, we discuss early results of Bing's launch and implications for the search landscape.

Key Points

Search activity remains robust. Total search queries in the U.S. in May grew 33% Y/Y, reflecting: 1) consumers' appetite to use search for Web navigation and bargain hunting, and 2) increased use of the Internet as a cheap entertainment platform. Our channel checks suggest that while 2Q has not seen material improvement in online spend, the large businesses continue to spend on SEM and SEO initiatives to drive traffic.
Google increases its lead in May . . . Google's search volume grew faster than the market in May at 39.7%, capturing 65% of market share vs. 64.2% in April. Google's gains come at the expense of Yahoo! (down ~30 bps m/m), Microsoft (down ~20 bps m/m), and AOL (down ~30 bps m/m). While Yahoo!'s share was slightly down, it still remained stable in the 20% + range.
. . . But MSFT gains momentum with the launce of Bing. comScore data suggests that Bing has attracted more searchers and higher search pages since launching the new platform 2 weeks ago, buoyed by a ~$100M ad campaign (which debuted last week.) Curiosity and novelty are certainly two elements driving the intereset as users test the much hyped engine; the important question is how sustainable will the share gain be once media attention and the mktg push abate. Our channel checks suggest that Bing has captured the searcher and search page share from the other four engines in roughly equal proportions.
comScore's report may be a less relevant gauge to assess Bing's performance since it did not include key metrics such as search query share or monetization. The increase in search result pages for Bing could indicate a higher use of the navigation options to refine searches, which increases page count, and/or lower relevance of results. Net net, it is too early to tell.
Is this a repeat of Cashback? MSFT's cashback reward for users of its search engine drove share gains in May to June 08 by roughly 70 bps, or a 15% m/m uptick in volume. This increase was, however, short lived as the company's market share reverted back to ~8.0% in May 09. While sustained marketing push would help Bing gain incremental share over time, we think it's unlikely that it will materially alter the competitive landscape, except maybe for weaker players like Ask and AOL. Having said that, material gains in traffic would require not just aggressive marketing but also a potential distribution deal with Yahoo!, in our opinion.

For the week ended Jun. 16, 2009, the Jefferies Internet Index (JII) is down 4.67% vs. the S&P 500, which was down 3.24%. YTD, the Jefferies Internet Index is up 20.8% vs. the S&P 500, which is up 0.96% (see page 5).

redacted version of the document. In this example, the criteria applied against the original document to result in page 600 are as follows: 1) text—redact by graying or blackening company and country names; 2) tables—redact by pixelization recommendations and numbers, but not the company names represented; and 3) graphs—redact by distortion the graphical image, but not the text on the axes. Table 2, below, represents the text appearing in the original 500 with the information redacted in version 600 underlined. The user has the option of purchasing or otherwise obtaining for download or viewing the full, un-redacted original report.

TABLE 2

Little respite in 3Q09

In aggregate we expect the telecom companies we cover in Korea, China, Singapore and New Zealand to report 8% revenue growth in 3Q09 translating to 3% EBITDA grown and 1% NPAT decline. SingTel and the Korean mobile operators should report good growth but the rest are likely to be flat to down on pcp. We remain Underweight on this sector (which has underperformed by 53% YTD). Our only Buy recommendations are in Korea where investor expectations are low (single digit PEs) and fundamentals don't look as bad as the rest of the sector.
SingTel and Korean mobile should report well
Strong 3Q09 growth is expected from SingTel and the Korean cellular operators. All of SingTel's key earnings contributors (domestic, Optus, Bharti and Telkomsel) should post good growth this quarter with currency movements expected to have only a minor negative impact on the overall S$ result. MNP in Korea eased in 3Q09, and in Sep numbers were lowest in 2004. Korean fixed line was very competitive.
Sector down 53% YTD
The telco sector in Asia Pacific (ex-Japan) continues to underperform the broader markets, now down 53% YTD on a relative basis. The sector beta is 0.75 so some underperformance is expected in a rising market, but not this much! Structural issues (in particular government sponsored national fibre networks and new mobile licenses) have dampened the outlook for the sector across the board.
Look to hide in Korea
With a cloudy outlook for most companies in the sector we look for markets and stocks where investor expectations are low. The only Buys we have are on the 3 Korean telcos which trade on single digit PEs (KT, LGT and LD Dacom). The Korean market looks set to benefit from cost cutting associated with sector consolidation which should drive at least some earnings growth.
SingTel the next best large-cap option in the region
Although rated a Hold, SingTel is the next best large cap telco stock. The Chinese telcos look dear given earnings declines this year and flat earnings next year. The smaller Singapore operators are groaning under the weight of pressure from SingTel. Telstra and TCNZ look unlikely to perform as while their governments weigh up how best to invest in fibre networks to compete against their own profitable fixed networks.

Hedge fund investors

Low beta sector may not be overly attractive to hedge funds.

Long-only investors

Look to invest in cheap Korean names, KT, LGT and LG Dacom. SingTel also worth a look at these levels. However continue to underweight the sector on a regional basis.

As an alternative to requiring full purchase or allocation in return for receiving the completely un-redacted document, the invention may be configured to associate with the offer a way for viewers to selectively purchase, or otherwise obtain, portions of the document in an a la carte fashion. Upon purchasing, for example, a portion of redacted information the system generates a partially redacted version of the document that reveals the selected redacted portion and retains the unselected redactions. In this manner, rather than purchasing the entirety of a report, a viewer may pay a lesser amount, or expend a reduced quantity of allocation or credit, to view only a portion of the redacted information. A Graphical User Interface (GUI) may be used to effect the selective election of information, such as recommendations, ratings, market share, graphical representations, tables, etc., as well as execute the associated transaction. For example, exemplary page 600 includes a series of boxes 602-616 that are associated with redacted information or sections of redacted information. The boxes enable a user to selectively purchase or obtain redacted content associated with the box. In this example, boxes 602-610 relate to redacted text portions, which are redacted by blacked out overlay, box 612 relates to redacted table information, which is redacted by pixelization, and boxes 614-616 relate to redacted graphical information, which is redacted by distortion.

Figure 7B:
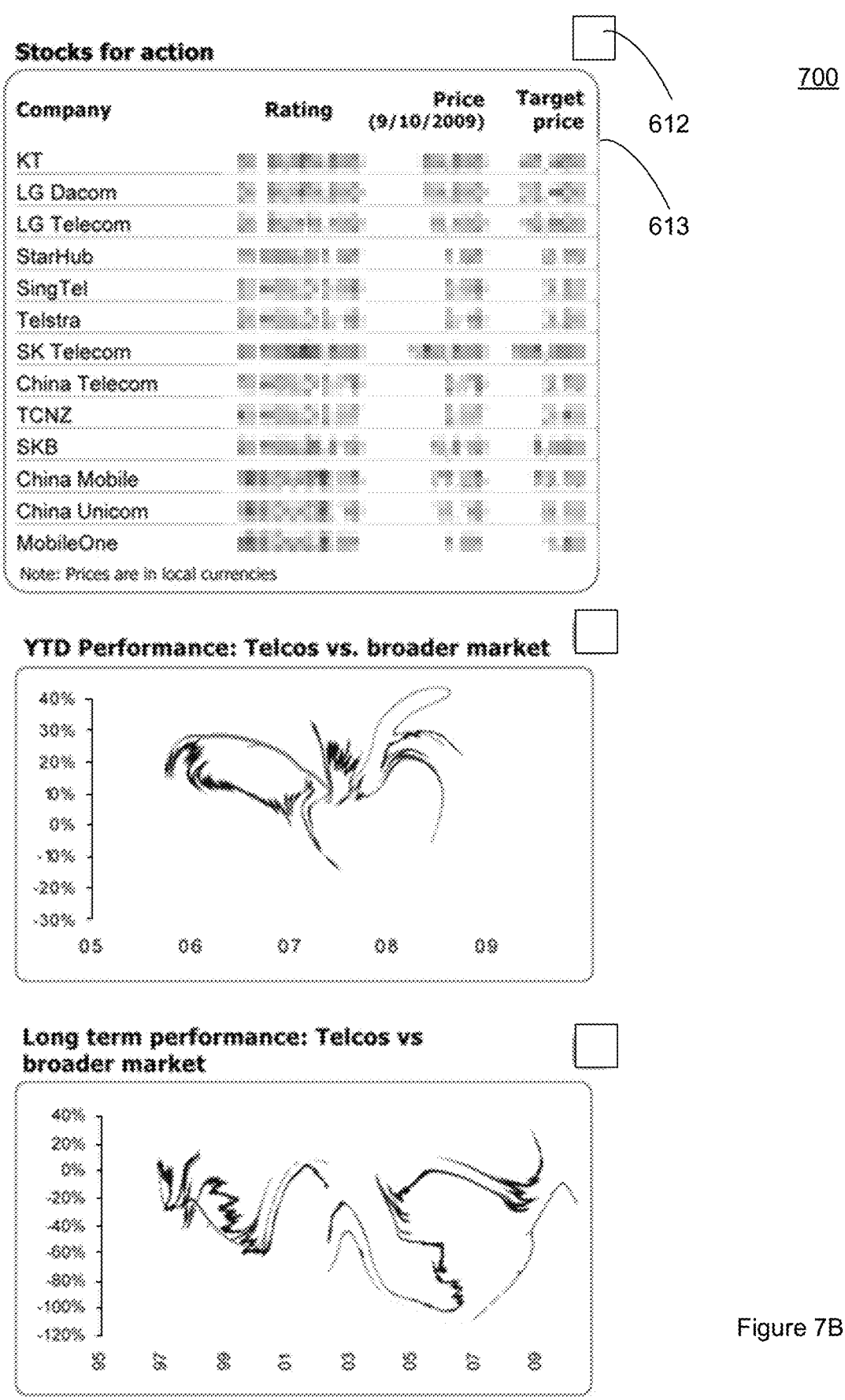

FIGS. 7A-B show a partially-redacted version 700 of page 500 of FIGS. 5A-B. In this example, a user has selected for viewing the content associated with box 602 by selecting that box using a GUI. Upon completion of any required transaction, e.g., purchase, the portion 603 of page 700 is presented in an un-redacted form. In this example, the un-redacted portion is shown as part of the remaining redacted version of the document, however, the invention is not limited to this particular form. The invention contemplates a wide variety of techniques for displaying the selected portion to a user, either in combination with other content or not. For example, the system may open a new window or document to show the selected information. In addition, the system may generate or call for viewing a new or specific version of the document associated with the selected content. This new or specific version of the document may include only selected portions or may also include information that was not redacted from the original document, e.g., Title of report, company name, company and/or industry profile, etc. In this manner, the new or specific version may not include any redacted information and gives the appearance of an original document.

Figure 8:
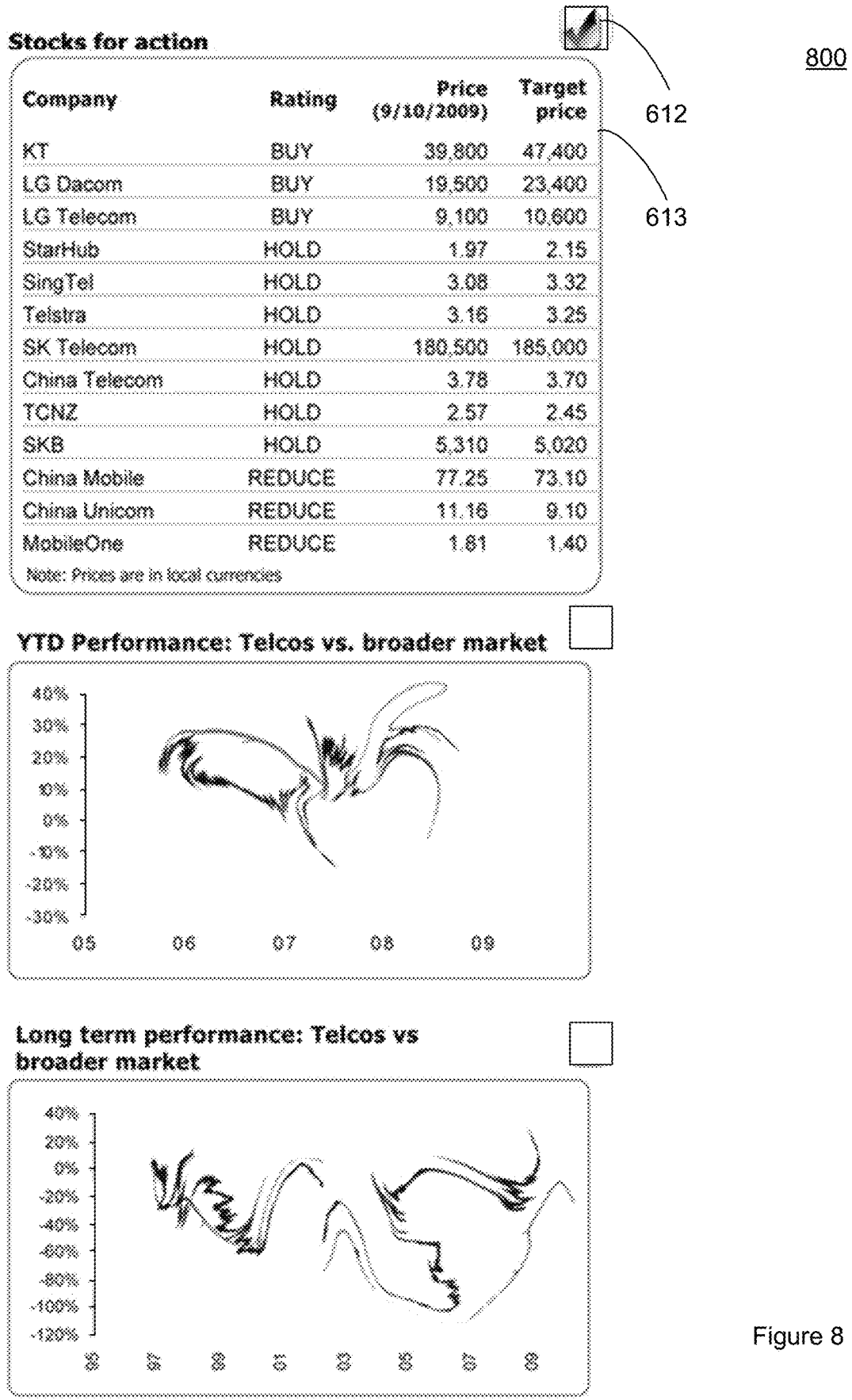
FIG. 8 represents the document of FIGS. 7A-B, after execution of any transaction, in which the user has selected a part of the document to display; and, FIG. 9 represents the document of FIG. 7A-B, after execution of any transaction, in which the user has selected a part of the document to display.
Figure 9:
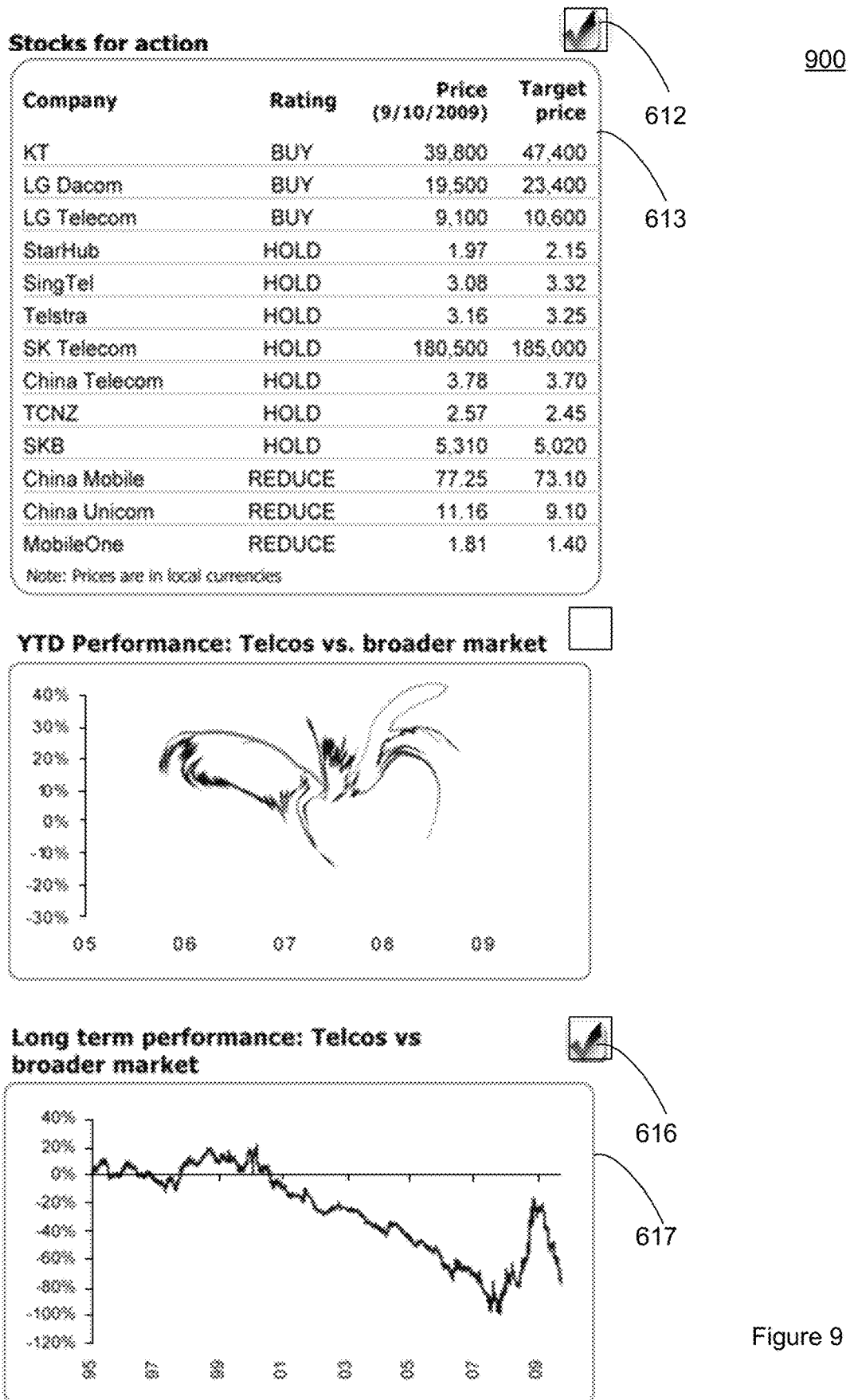

The exemplary page 800 of FIG. 8 represents a further example where the user has selected, either in separate operations or together in the same operation, boxes 602 and 612. In this example the system, after executing any associated or required transaction, displays in addition to portion 603 the content, table 613, associated with box 612. As is seen, the remaining unselected portions of the redacted version of the document remain redacted. The exemplary page 900 of FIG. 9 represents a further example where the user has selected, either in separate operations or together in the same operation, boxes 602, 612 and 616. In this example the system, after executing any associated or required transaction, displays in addition to the portions 603 and 613 the content, graph 617, associated with box 616. As is seen, the remaining unselected portions of the redacted version of the document remain redacted. In the examples of FIGS. 7-9, the respective partial redacted versions 700, 800 and 900 each represent a partial redacted version that is a concatenation of the originally un-redacted portions, selected redacted portions that are rendered un-redacted, and remaining redacted portions.

FIGS. 7-9 illustrate one exemplary implementation of the "partial redaction" alternative. While the examples illustrate the GUI as presenting selection boxes it is understood that this is not limiting and that the particular implementation of this feature is not critical to the invention. For example, the selection feature may be in the form of or a combination of dialog boxes or windows, a listing in the margin or separate panel, and may be in conjunction with hovering the cursor over the redacted portions. Further, the system may present a "shopping list" of available portions of the document for selective purchase/viewing. Also, upon completion of the transaction the selected portions may be revealed directly on the redacted version of the document or may open into a separate window or screen for viewing and/or download.

In further alternative configurations, the invention may provide for a progressive credit to the viewer as the viewer purchases or otherwise obtains portions of the document such that once the viewer has cumulatively reached the full value of the offer then the viewer is provided with the complete un-redacted original document. This is particularly attractive where the sum of the redacted "parts" or portions of the document exceed a cost or allocation of the whole un-redacted original document. This may encourage viewers to view portions to whet their appetite with the assurance that worst case is that they pay or are allocated the set value of the whole document.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-implemented method for controlling access to electronic content in an original version of a first electronic document stored in a database at a first computer system by providing a version of the first electronic document as a second electronic document to a remote computer system, the method comprising:
    associating by the first computer system an original electronic document with an offering;
    identifying by a redaction module of the first computer system a set of content type information to redact from the original document, the set of content type information being identified for redaction based at least in part on a weighted combination of criteria other than location of the content type information within the original electronic document and on a set of machine learning techniques applied by the redaction module, the set of machine learning techniques providing for automatic learning by the redaction module of the set of content type information to redact;
    generating by the redaction module of the first computer system a redacted version of the original document by redacting the set of content type information from the original electronic document;
    receiving by the first computer system a request for a set of information related to the original document from the remote computer system and identifying a set of responsive information;
    in response to the request, transmitting from the first computer system to the remote computer system the redacted version of the original document and a set of offers comprising offers respectively associated with at least one portion of the set of content type information redacted from the original document, whereby less than all of the set of content type information redacted from the original document is un-redacted based on a selection of one or more offers from the set of offers; and,
    presenting the offering via a user interface at the remote system, the offering representing a proposed transaction for obtaining at least a part of the redacted set of content type information from the original electronic document.

2. The method of claim 1 wherein the generating step further comprises one or more of the group consisting of: removing the set of content type information; blackening the set of content type information; obscuring the set of content type information; deleting the set of content type information; distorting the set of content type information; and replacing the set of content type information with unintelligible information.

3. The method of claim 1 wherein the weighted combination of criteria other than location of the content type information within the original electronic document comprises one or more of the group consisting of: text; words; numbers; letters; formulas; equations; graphical representations; table data; identities; identifiers; percentages; names; dates; recommendations; analysis; and quotes.

4. The method of claim 1 wherein the set of content type information comprises one or more of the group consisting of: a financial number; a recommendation; a rating; a set of financial phrases; a currency amount; a company name; market related information; graphical representations; table related information; formula related information; nouns; verb phrases; adjectives; facts; events; technical findings; and research findings.

5. The method of claim 1 wherein the offering is one of a group consisting of: an offer to purchase; an offer to utilize an existing account; an offer to utilize an existing credit; an offer to utilize an existing allocation; a marketing program; a charitable offering; and an education related offering.

6. The method of claim 1 wherein the generating step further comprises automatically presenting for manual selection at least some of the content type information and receiving a set of responses representing selections from among the at least some of the content type information for redaction.

7. The method of claim 6 wherein the generating step further comprises a set of selections comprising accept, reject, change or add to the presented manual selection.

8. The method of claim 1 further comprising:
after transmitting the redacted version of the original document receiving a second request indicating a desire to receive a second set of responsive information, the second set of responsive information comprising at least a portion of the set of responsive information; and
transmitting the second set of responsive information.

9. The method of claim 8 further comprising:
transmitting an offer associated with the second set of information; and
receiving acceptance of the offer prior to transmitting the second set of information, whereby at least part of the set of content type information redacted from the original electronic document is revealed.

10. The method of claim 1 wherein a graphical user interface is used in the generating and transmitting steps.

11. The method of claim 1 wherein the redacted version of the original electronic document is generated so as to include essentially the same layout of the original electronic document.

12. An article comprising a non-transitory machine-readable medium, the medium having stored thereon instructions to be executed by a machine to perform operations for controlling access to electronic content in an original version of a first electronic document stored in a database at a first computer system by providing a version of the first electronic document as a second electronic document to a remote computer system, the article comprising instructions adapted to:
associate by the first computer system an original electronic document with an offering;
identify by a redaction module of the first computer system a set of content type information to redact from the original document, the set of content type information being identified for redaction based at least in part on a weighted combination of criteria other than location of the content type information within the original electronic document and on a set of machine learning techniques applied by the redaction module, the set of machine learning techniques providing for automatic learning by the redaction module of the set of content type information to redact;
generate by the redaction module of the first computer system a redacted version of the original document by redacting the set of content type information from the original electronic document;
receive by the first computer system a request for a set of information related to the original document from the remote computer system and identify a set of responsive information; and
in response to the request, transmit from the first computer system to the remote computer system the redacted version of the original document and a set of offers comprising offers respectively associated with at least one portion of the set of content type information redacted from the original document, whereby less than all of the set of content type information redacted from the original document is un-redacted based on a selection of one or more offers from the set of offers; and,
present the offering via a user interface at the remote system, the offering representing a proposed transaction for obtaining at least a part of the redacted set of content type information from the original electronic document.

13. The article of claim 12 wherein the instructions adapted to generate a redacted version of the original document comprises instructions adapted to perform one or more of the group consisting of: removing the set of content type information; blackening the set of content type information; obscuring the set of content type information; deleting the set of content type information; distorting the set of content type information; and replacing the set of content type information with unintelligible information.

14. The article of claim 12 wherein the weighted combination of criteria other than location of the content type information within the original electronic document comprises one or more of the group consisting of: text; words; numbers; letters; formulas; equations; graphical representations; table data; identities; identifiers; percentages; names; dates; recommendations; analysis; and quotes.

15. The article of claim 12 wherein the set of content type information comprises one or more of the group consisting of: a financial number; a recommendation; a rating; a set of financial phrases; a currency amount; a company name; market related information; graphical representations; table related information; formula related information; nouns; verb phrases; adjectives; facts; events; technical findings; and research findings.

16. The article of claim 12 wherein the offering is one of a group consisting of: an offer to purchase; an offer to utilize an existing account; an offer to utilize an existing credit; an offer to utilize an existing allocation; a marketing program; a charitable offering; and an education related offering.

17. The article of claim 12 wherein the instructions further comprise automatically presenting for manual selection at least some of the content type information and receiving a set of responses representing selections from among the at least some of the content type information for redaction.

18. The article of claim 17 wherein the instructions further comprise a set of selections comprising accept, reject, change or add to the presented manual selection.

19. The article of claim 12 further comprising:
after transmitting the redacted version of the original document receiving a second request indicating a desire to receive a second set of responsive information, the second set of responsive information comprising at least a portion of the set of responsive information; and
transmitting the second set of responsive information.

20. The article of claim 19 further comprising:
transmitting an offer associated with the second set of information; and
receiving acceptance of the offer prior to transmitting the second set of information, whereby at least part of the set of content type information redacted from the original electronic document is revealed.

21. The article of claim 12 further comprises instructions related to implementing a graphical user interface.

22. The article of claim 12 wherein the redacted version of the original electronic document is generated so as to include essentially the same layout of the original electronic document.

23. A computer-based system comprising memory and a processor for executing instructions to perform operations for controlling access to electronic content in an original version of a first electronic document stored in a database at the computer-based system by providing a version of the first electronic document as a second electronic document to a remote computer system, the system comprising:

input adapted to receive at the computer-based system an original electronic document associated with an offering;

a redaction module adapted to automatically identify a set of content type information to redact from the original document, the set of content type information being identified for redaction based at least in part on a weighted combination of criteria other than location of the content type information within the original electronic document and on a set of machine learning techniques applied by the redaction module, the set of machine learning techniques providing for automatic learning by the redaction module of the set of content type information to redact;

the redaction module further adapted to generate a redacted version of the original document by redacting the set of content type information from the original electronic document;

input adapted to receive by the computer-based system a request from the remote computer system for a set of information related to the original document and identifying a set of responsive information; and output adapted to transmit, in response to the request, the redacted version of the original document from the computer-based system to the remote computer system and further adapted to present the offering via a user interface at the remote system, the offering representing a proposed transaction for obtaining at least a part of the redacted set of content type information from the original electronic document, and further adapted to transmit a set of offers comprising offers respectively associated with at least one portion of the set of content type information redacted from the original document, whereby less than all of the set of content type information redacted from the original document is un-redacted based on a selection of one or more offers from the set of offers.

24. The system of claim 23 wherein the redaction module comprises code adapted to perform redaction including one or more of the group consisting of: removing the set of content type information; blackening the set of content type information; obscuring the set of content type information; deleting the set of content type information; distorting the set of content type information; and replacing the set of content type information with unintelligible information.

25. The system of claim 23 wherein the weighted combination of criteria other than location of the content type information within the original electronic document comprises one or more of the group consisting of: text; words; numbers; letters; formulas; equations; graphical representations; table data; identities; identifiers; percentages; names; dates; recommendations; analysis; and quotes.

26. The system of claim 23 wherein the set of content type information comprises one or more of the group consisting of: a financial number; a recommendation; a rating; a set of financial phrases; a currency amount; a company name; market related information; graphical representations; table related information; formula related information; nouns; verb phrases; adjectives; facts; events; technical findings; and research findings.

27. The system of claim 23 wherein the offering is one of a group consisting of: an offer to purchase; an offer to utilize an existing account; an offer to utilize an existing credit; an offer to utilize an existing allocation; a marketing program; a charitable offering; and an education related offering.

28. The system of claim 23 wherein the redaction module further comprises code adapted to automatically present for manual selection at least some of the content type information and to receive a set of responses representing selections from among the at least some of the content type information for redaction.

29. The system of claim 28 wherein the redaction module further comprises code adapted to present a set of selections comprising accept, reject, change or add to the presented manual selection.

30. The system of claim 23 further comprising code adapted to:

receive a second request indicating a desire to receive a second set of responsive information, the second set of responsive information comprising at least a portion of the set of responsive information; and transmit the second set of responsive information.

31. The system of claim 30 further comprising code adapted to:

transmit an offer associated with the second set of information; and receive acceptance of the offer prior to transmitting the second set of information, whereby at least part of the set of content type information redacted from the original electronic document is revealed.

32. The system of claim 23 wherein the output transmits the offer and the request for a set of information is in response to the transmitted offer, the redacted version of the original document being associated with the offer.

33. The system of claim 23 further comprising a graphical user interface.

34. The system of claim 23 wherein the redacted version of the original electronic document is generated so as to include essentially the same layout of the original electronic document.

* * * * *